United States Patent [19]

Kroos et al.

[11] Patent Number: 5,117,283
[45] Date of Patent: May 26, 1992

[54] PHOTOBOOTH COMPOSITING APPARATUS

[75] Inventors: Donna S. Kroos, Rochester; David K. McCauley, Henrietta; Kurt M. Sanger, Rochester, all of N.Y.

[73] Assignee: Eastman Kodak Company, Rochester, N.Y.

[21] Appl. No.: 542,619

[22] Filed: Jun. 25, 1990

[51] Int. Cl.$^5$ .............................................. H04N 9/73
[52] U.S. Cl. .................................... 358/22; 358/182
[58] Field of Search ................... 358/22, 22 CR, 182

[56] References Cited

U.S. PATENT DOCUMENTS

| | | | |
|---|---|---|---|
| 4,297,724 | 10/1981 | Masuda et al. | 358/93 |
| 4,602,286 | 7/1986 | Kellar et al. | 358/183 |
| 4,698,682 | 10/1987 | Astle | 358/182 |
| 4,800,432 | 1/1989 | Barnett et al. | 358/160 |
| 4,827,344 | 5/1989 | Astle et al. | 358/183 |

FOREIGN PATENT DOCUMENTS

| | | | |
|---|---|---|---|
| 1-212192 | 8/1989 | Japan | 358/22 CK |
| 2-54693 | 2/1990 | Japan | 358/22 CK |

*Primary Examiner*—James J. Groody
*Assistant Examiner*—Kim Yen Vu

[57] ABSTRACT

An image capture and compositing apparatus for a photobooth (10) photographs a customer against a fixed color background (28), extracts the customer from that image and then inserts the extracted customer image into an arbitrary background image in such a manner that there are no noticeable artifacts between the inserted image and the background image and so that it appears that the subject was actually situated in the background scene when photographed. The imagery processing mechanism employed generates a pair of masks, one of which is associated with the foreground image and the other of which is associated with the background image. These masks are used to extract the subject (160) from an image of the subject against a reference color backdrop, to define what portion of the background image is to be blanked out and to controllably blend the border of the inserted subject image with the background image. The photobooth contains a customer lighting system (50,42) located above and behind the position where the customer is seated. A separate backdrop lighting system (32) is located behind the customer and illuminates a blue reference backdrop against which the customer is photographed and which is photographed per se to provide a reference for mask production.

46 Claims, 6 Drawing Sheets

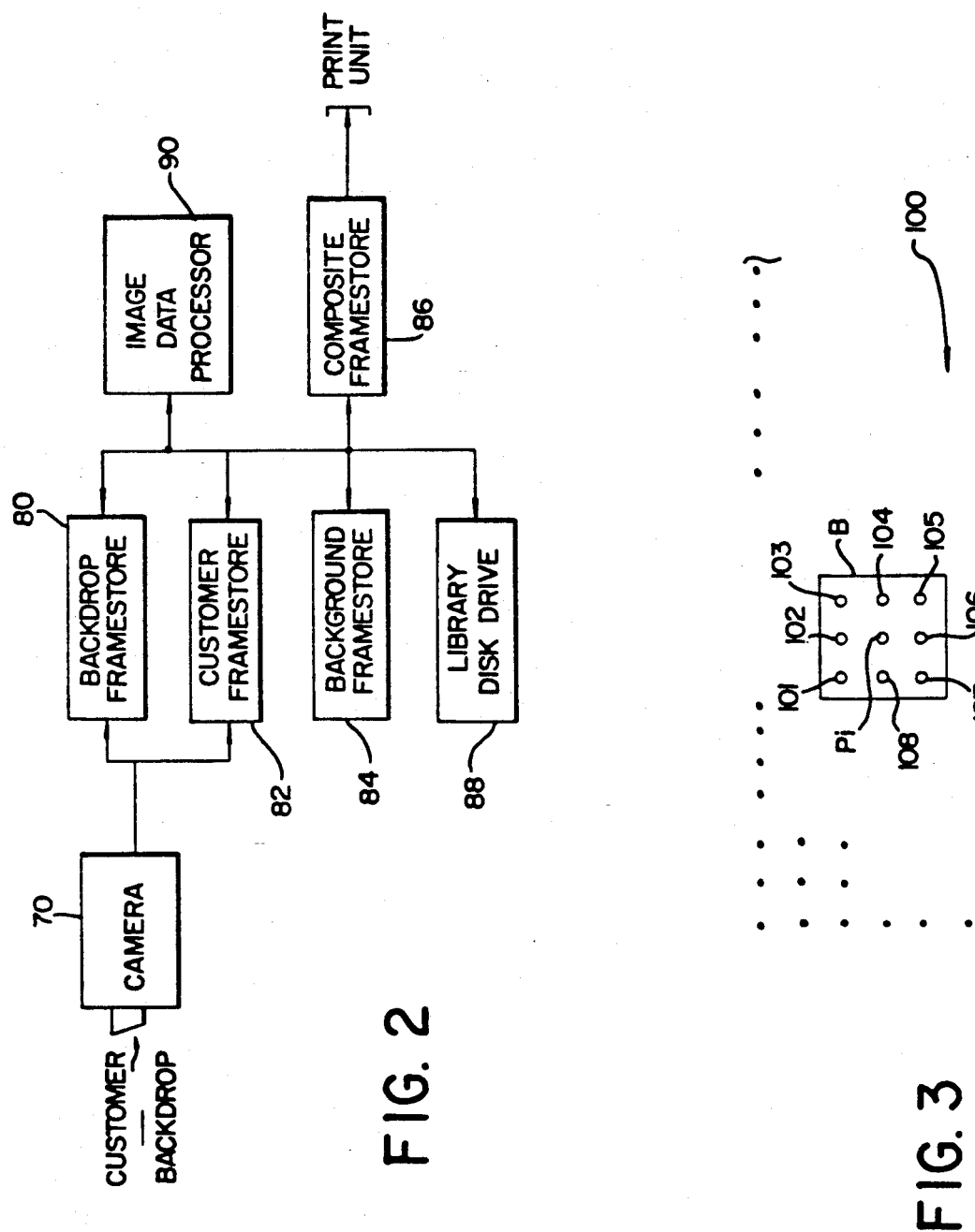

PHOTOBOOTH COMPOSITING APPARATUS

FIELD OF THE INVENTION

The present invention relates in general to imagery data processing systems and is particularly directed to an apparatus for controllably superimposing a foreground image (e.g. the image of a human subject) on an arbitrary background image (e.g. a recreational scene) in a manner which provides a more 'natural' or realistic presentation of the subject in the background scene without introducing artifacts along the border or interface of the foreground image with the background image.

BACKGROUND OF THE INVENTION

In computer-based image composition and editing systems, which store imagery data in digital format, it is common practice to selectively combine plural images by merging or inserting a first image, termed the 'foreground' image, into or on top of a second image termed the 'background' image. A typical example is the extraction of an image of a human subject that has been taken against a prescribed color backdrop (usually blue) and inserting the extracted image into a scenic background (for example, an image of the U.S. Capitol building in Washington D.C. ). Because the images are different, along the edge or border between the background image and the foreground image, an undesirable boundary artifact is created. This anomaly is particularly pronounced where the border has an arbitrary shape (as in the case of a human subject), due to the quantized format of the image data base and the finite matrix configuration of the pixels of the display used to combine the images. One possible mechanism for reducing the artifact is to locally blur the edge of the 'pasted' foreground, in order to 'soften' the effect of the image discontinuity. This 'softening' or 'electronic air-brushing' is carried out by an operator using a zoom feature of image editing software, so that it is both labor-intensive and inexact (a pasted foreground image with a blurred border).

SUMMARY OF THE INVENTION

In accordance with the present invention, there is provided an image capture and compositing apparatus which is capable of controllably merging separate, digitally formatted foreground and background images in a manner which effectively eliminates the above-mentioned artifact and automatically performs a gradual blending of the interface between the foreground image and the background image, so that the foreground image appears to be more naturally part of the background image. In particular, the image capture and compositing apparatus of the present invention is directed to what is commonly referred to as a photobooth, in which an image of a subject is taken while the subject is positioned (e.g. seated) in front of some prescribed backdrop. Unlike a conventional photobooth, however, in which the resultant photograph that is delivered to the customer is simply an image of what the imaging camera sees (the subject against the photobooth backdrop), the photobooth of the present invention contains an imagery processing mechanism which photographs the subject against a fixed color backdrop, extracts the subject from that image and then inserts the extracted subject's image into an arbitrary background image in such a manner that there are no noticeable artifacts between the inserted image and the background image and so that it appears that the subject was actually situated in the background scene when photographed.

In order to successfully define the subject image and how the subject is to be inserted into the background image, the present invention generates a pair of masks, one of which is associated with the foreground image (the subject) and the other of which is associated with the background image (an arbitrary scene, such as the previously mentioned picture of the U.S. Capitol building). These masks are used to extract the subject from an image of the subject against a uniformly colored, reference color backdrop, to define what portion of the background image is to be blanked out, so that the subject may be inserted, and to controllably blend the border of the inserted subject image with the background image.

To define each mask, an image of the uniformly colored (e.g. blue) backdrop, which is to serve as a reference for identifying the subject, is initially obtained. For this purpose the photobooth contains a backdrop lighting system located above and behind the location where the subject is to be positioned. The backdrop lighting system preferably contains a source of white diffuse light which uniformly illuminates the backdrop so that the photobooth imaging camera sees and captures a substantially soft image of only the backdrop. This reference image is digitized and stored in memory (an attendant framestore) as a first plurality of first image data values respectively representative of the contents of the backdrop image, as seen by the camera's imaging pixel array. This reference image may be periodically updated at times when the photobooth is not being used by a customer, in order to maintain the system's calibration of the current conditions of the photobooth.

When the photobooth is used by a customer, the customer (subject) is seated at a location in front of the backdrop. The subject's location is illuminated by lighting sources located above, in front of and behind the subject. The light sources which backlight the subject are preferably of a color (e.g. yellow) and intensity so that, when reflected off the subject, the backlight effectively cancels blue fringing that may occur along the perimeter of the subject's image, which may be particularly noticeable around the hair, shoulders and ears. The intensity of the backlighting source may be such that its luminance component at the subject's location is equivalent that of the luminance component of the light reflected from the blue backdrop at the subject's location. Additional light sources directly above and in front of the subject's position provide full lighting for the entirety of the face and upper torso of the seated customer. The intensity of these light sources is such that it is one-half of the luminance component of the light reflected from the blue backdrop at the subject's location. This increased luminance component of the subject illumination enables the imagery signal analysis mechanism of the invention to discriminate between subject and backdrop regardless of the color of clothing worn by the subject.

The photobooth imaging camera receives and captures an image of the subject fully illuminated against the separately illuminated blue backdrop. This second or subject image of both the subject and the illuminated blue reference backdrop is digitized and stored in memory as a second plurality of second image data values respectively representative of the contents of the subject image a seen by the camera's imaging pixel array.

These reference and subject images are processed in accordance with a luminance and chrominance dependent filtering mechanism in order to effectively define a first, foreground mask that is used to extract the subject from the second image and thereby define where the subject is to be inserted into the background image, and a background mask that is used to define where the background is to be retained. The background image (e.g. the previously referenced image of the U.S. Capitol building) may be selectively accessed from an image library of background scenes and is stored in an associated framestore. Like the reference color backdrop and subject images, the background image is digitized as a third plurality of third image data values respectively representative of the contents of the background image at a plurality of locations corresponding to the imaging camera's pixel array.

In particular, the background mask (which defines where the background image is to be retained) is generated in dependence upon the degree of predominance of the backdrop color in the second (subject) image. Namely, if, at an arbitrary pixel location in the subject image, the data value effectively corresponds to both the luminance and chrominance components of the backdrop then it is inferred that what the camera sees is only the backdrop (there is no subject image content at this pixel location) and the subject image is masked out (the background image data is retained as is).

The foreground mask, on the other hand, (which defines where the image of the customer (subject) is to be retained) is generated in dependence upon the degree of presence of colors (e.g. green and red) other than the blue of the backdrop in the second image. If, at an arbitrary pixel location in the subject image, the data value contains substantial green and/or red content, then it is inferred that what the camera sees is the customer rather than the blue backdrop and the background image is masked out (the subject image data is retained as is).

At those pixel locations which lie along the perimeter of the subject in the second image border, the spectral content of the subject may not be as well defined as it is in an interior portion of the subject image. At these locations, which correspond to the borders of the foreground and background masks, the image data values may contain contributions from both the blue backdrop and the subject. As a consequence, pixel values along the borders of the foreground and background masks are weighted on the basis of their spectral content referenced to the blue backdrop. Similarly, where there is a shadow along the subject's perimeter, so that there is no real subject content but merely a reduction in luminance of the adjacent pixel locations, the color content of the subject is masked in the background mask and the background is retained.

To form the composite image, the foreground and background masks are applied to the respective customer and background images and the resultant images summed to produce the composite containing the subject inserted into the background.

BRIEF DESCRIPTION OF THE DRAWINGS

FIG. 2 diagrammatically shows an imagery data processing system for processing imagery data output by the camera employed in the photobooth of FIG. 1;

FIG. 3 shows a block or plurality of neighboring pixels that surround an arbitrary pixel location Pi within a pixel array;

DETAILED DESCRIPTION

Figure 1:
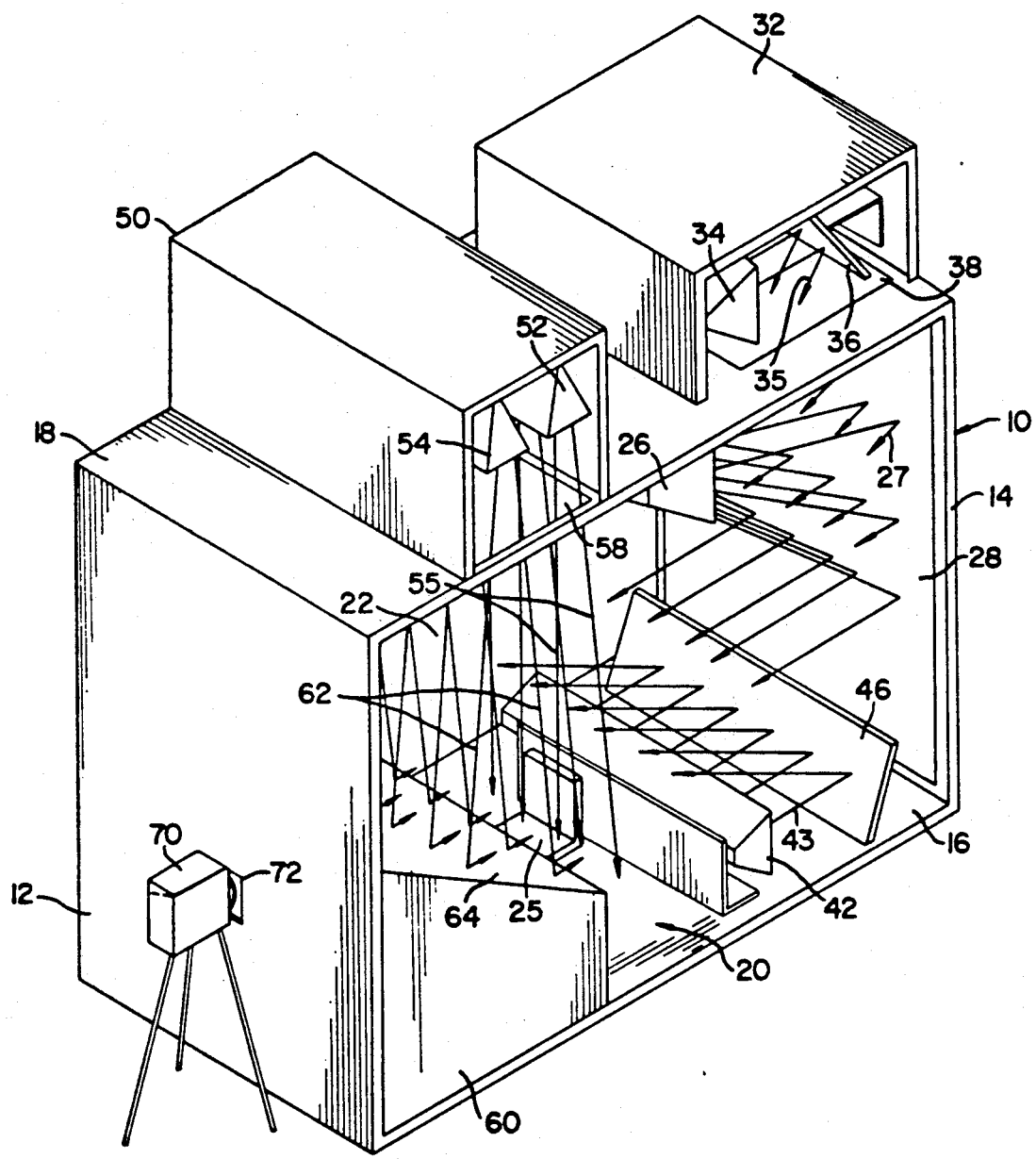
FIG. 1 diagrammatically shows a photobooth in accordance with a preferred embodiment of the present invention.

Referring now to FIG. 1 a photobooth 10 in accordance with a preferred embodiment of the present invention is diagrammatically shown in perspective as being of generally rectangular modular configuration defined by front and rear walls 12 and 14, respectively, a floor 16 and a ceiling 18 which enclose an interior region 20. The photobooth also includes a pair of sidewalls one of which is shown at 22 and the other of which is removed in the drawing to show the interior of the structure. Preferably one of the sidewalls has an opening covered by a 'light curtain' through which the customer enters and exits the photobooth, the curtain when closed serving to prevent the entry of exterior light.

Lighting within the photobooth is provided by a lighting system located above and behind the location where the subject is to be positioned for illuminating both a reference backdrop and the subject. More particularly, a backdrop lighting unit 26 is mounted to the ceiling 18 to the rear of a location 25 where the customer is to be seated. Backdrop lighting unit 26 preferably contains multiple halogen lamps as a source of white light and a diffuser. Rays 27 illuminate a colored backdrop panel 28. (It is to be observed that the choice of colors for backdrop panel 28 is not limited to blue. This color is merely given as an example.)

The subject's location 25 is illuminated by respective lighting sources located above, in front of and behind the subject. Specifically an upper backlighting unit 32 is mounted atop ceiling 18 and contains a lamp 34, emitted light rays 35 from which are reflected by a mirror 36 and diffused by way of a yellow-colored diffuser panel 38 mounted in an opening in the ceiling. The intensity of the light emitted by lamp 34 and the color of diffuser panel 38 are such that, when reflected off the subject, the yellow backlight effectively cancels color fringing (here, blue) that may occur along the perimeter of the subject's image, which may be particularly noticeable around the hair, shoulders and ears. Moreover, the intensity of the backlighting source is preferably such that its luminance component at the subject's location 25 is equivalent to that of the luminance component of the light reflected from the colored backdrop 28 at location 25.

The subject is also backlighted by way of a lower backlighting unit 42 mounted to floor 16 and containing a lamp the emitted light rays 43 from which are reflected by a mirror 46 and projected to the subject's position 25. Like the upper backlighting source the intensity and color (e.g. yellow) of the light emitted by lamp 44 are such that, when reflected off the subject, the lower backlight effectively cancels blue fringing that may occur along the perimeter of the subject's image.

Additional light sources 52 and 54 supported in a housing 50 mounted atop ceiling 18 above the subject's seat 25 provide full lighting for the entirety of the face and upper torso of the seated customer. For this purpose, light rays 55 emitted by a lamp 52, which is positioned directly above the subject's seat 25, are diffused by a diffuser panel 58 to provide soft illumination of the subject's head and shoulders. Light rays 62 from a lamp 54 pass through diffuser panel 58 and reflect off an inclined reflector surface 64 of a forward electronics cabinet 60, so as to illuminate the subject's face from underneath and provide fill-in lighting to the subject's chin and nose and thereby complete a natural daylight type of illumination of the subject. Like backdrop panel 28, reflector surface 64 may comprise a thin layer of styrofoam or other diffuse reflecting material. The intensity of the subject illumination is such that its luminance component at the subject's location is half that of the luminance component of the light reflected from the backdrop panel 28. This differential between the luminance component of backdrop and subject lighting enables the imagery signal analysis mechanism of the invention (to be described in detail below) to discriminate between subject and backdrop regardless of the color of clothing worn by the subject. Namely, assuming that backdrop panel 28 has a prescribed blue hue then, even if the subject's clothing has exactly the same blue color, so that, to the naked eye, the clothing/torso of the subject would seem to disappear into the blue backdrop, the difference in luminance of the backdrop light source and the backlighting sources makes it possible for the imagery signal processor to distinguish between subject and backdrop.

A digital RGB still video camera 70 is positioned in front of a viewing window 72 in front wall 12. When operated by a control unit housed in cabinet 60, whether in response to the operation of a customer interface device or during a separately initiated calibration mode, camera 70 outputs video imagery signals for processing by an attendant digital processor unit. As the details of the customer interface through which the composition of an image of a customer and a selected background image are unnecessary for an appreciation of the present invention, which is principally directed to the image extraction and compositing mechanism using the lighting arrangement of the above described photobooth, they will not be described here.

When camera 70 is operated in the absence of a subject seated at location 25, it captures an image of the blue backdrop 28. The 'reference' backdrop image, which is to be used to generate a mask for extracting a subject from a subsequently obtained image of a subject against the backdrop, is digitized and stored in an attendant framestore of the control unit, as a first plurality of image data values respectively representative of the contents of the blue backdrop image a seen by the camera's imaging pixel array. As noted previously, this reference image may be periodically updated at times when the photobooth is not being used by a customer, so as to maintain the system's calibration to the current conditions of the photobooth.

When a customer (subject) is photographed, the customer is seated at location 25 so that the camera captures an image of the subject fully illuminated against the blue backdrop. This image of both the subject and the blue backdrop is captured by camera 70 and then digitized and stored in an associated framestore as a second plurality of image data values respectively representative of the contents of what is to constitute the foreground image of the composite image to be generated. The reference and subject images are then processed in accordance with a chrominance and luminance-dependent color filtering mechanism to be described below in order to effectively define a foreground mask that is used to extract the subject from the second image and thereby define where the subject is to be inserted into the background image, and a background mask that is used to define where the background is to be retained. These foreground and background masks are applied to the respective customer and background images and the resultant images are summed to produce a composite containing the subject inserted into the background.

Referring now to FIG. 2, an imagery data processing system for processing imagery data output by camera 70 so as to form a composite image of a customer and an arbitrary background (e.g. that stored in a background framestore that is selectively definable by the operation of a customer interface device) is diagrammatically shown as comprising a set of imagery data storage units (framestores) 80, 82, 84 and 86 respectively associated with the storage of a backdrop image, a customer/subject image, a background image and a composite image. Each of framestores 80 and 82 is coupled to receive digitally encoded imagery signals output by camera 70 for processing by an attendant digital signal processor 90. In particular framestore 80 is coupled to receive backdrop imagery data while framestore 82 is coupled to receive customer imagery data. Background framestore 84 is coupled to an associated background image library 88 (e.g. storage disk drive unit) and composite framestore 86 is coupled to store a composite image resulting from the processing of the customer imagery data extracted from the image stored in framestore 82 and background imagery data stored in framestore 84 in accordance with mask operators generated by processor 90, based upon a comparative analysis of the imagery data stored in backdrop and customer framestores 80 and 82, respectively.

Pursuant to a preferred embodiment of the invention, this comparative analysis is conducted on a pixel by pixel basis for each pixel within an image array of interest, using imagery data associated with the pixel of interest and a plurality of neighboring pixels that surround the pixel of interest. In particular, as shown in FIG. 3, for an arbitrary pixel location Pi within a pixel array 100, corresponding to the imaging pixel array within camera 70, the imagery data value (chrominance and luminance) for that pixel Pi and those of a block B of eight immediately adjacent pixels 101 . . . 108 surrounding pixel Pi (i.e. data values for a total of nine pixels) are employed in each computation with respect to pixel location Pi. It is to be observed that the number of pixels within a block of pixels over which imagery data for a pixel of interest is processed is not limited to nine, but may encounter additional pixels if desired.

However, the number chosen here has been determined to provide a practical data accumulation window that produces both a satisfactory composite image and is readily implementable without introducing inordinate digital processing overhead.

Figure 4A:
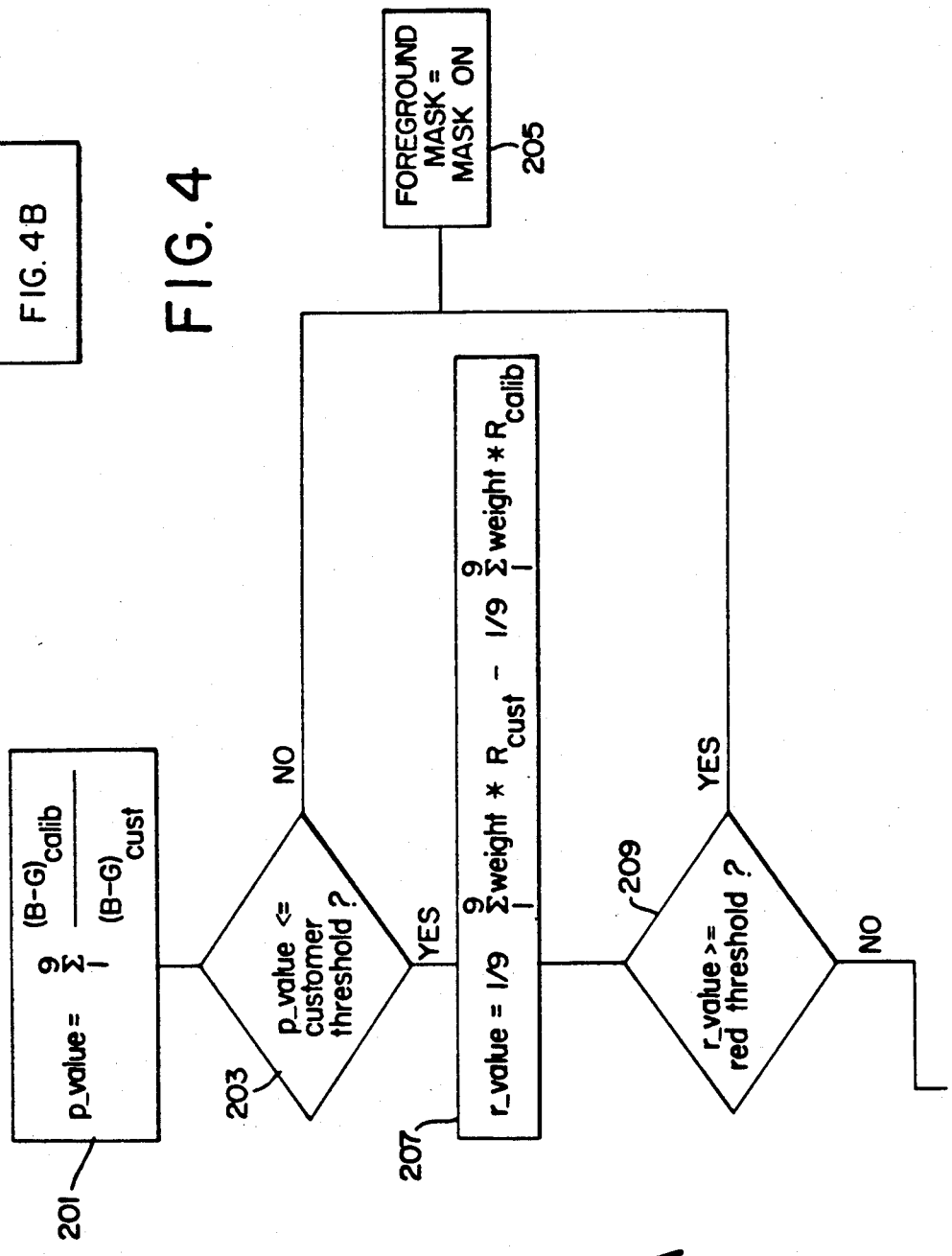
FIGS. 4a-4b are imagery data processing flow chart detailing the steps that are carried out by image processor in the course of its analysis of backdrop and customer imagery data in accordance with the present invention.
Figure 4B:
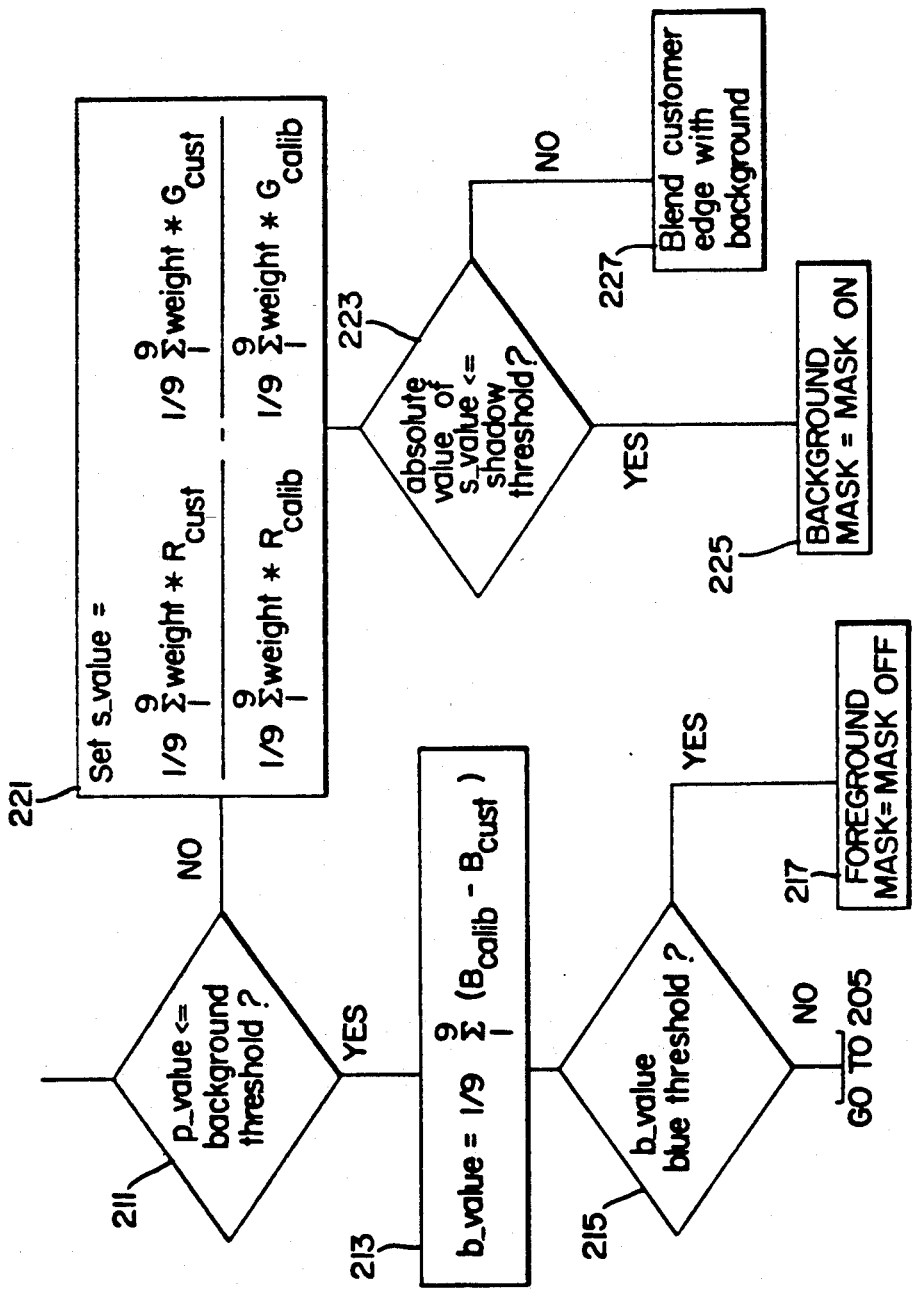

FIG. 4 is an imagery data processing flow chart detailing the steps that are carried out by processor 90 in the course of its analysis of backdrop and customer imagery data that has been captured by camera 70 and downloaded into framestores 80 and 82, in order to generate the above-mentioned foreground and background masks through which the customer image and the background image are selectively combined to produce a composite image, which is then stored in framestore 86 where it may be accessed to produce a hard copy print for the customer.

As pointed out above, the reference imagery data stored in framestore 80 is obtained by illuminating blue backdrop panel 28 via a dedicated backdrop illumination unit 26 and capturing an image of the backdrop via camera 70. The digitally encoded imagery data is then downloaded into framestore 80, so that framestore 80 contains a plurality of image data values respectively representative of the contents of the (blue) reference backdrop as imaged on the pixel array at the imaging plane of camera 70. This backdrop imaging may be conducted periodically in order to maintain the system calibrated to current operating conditions. Suffice it to say that framestore 80 contains imagery data representative of the backdrop against which customer is to be photographed.

The customer is photographed when seated at location 25 which is separately illuminated via front, overhead and backlighting units, as described above with reference to FIG. 1. The digitally encoded customer imagery data is then downloaded into framestore 82, so that framestore 82 contains a plurality of image data values respectively representative of an image of the customer against the blue reference backdrop.

Referring again to FIG. 4, for each pixel location Pi, the signal analysis process for deriving respective foreground and background mask operators through which the customer image and the background image are filtered to obtain the customer-background composite begins with step 201, which generates a p_value representative of the likelihood that the pixel is located in the backdrop portion of the customer image. Specifically, in the present example of using blue as the backdrop color, step 201 generates a ratio $(B-G)_{calib}/(B-G)_{cust}$ for each of the pixels of the block B (FIG. 3) and sums these ratios over the entire block of nine pixels, where B is the blue component of the color image data value and G is the green component. Also, in the flow chart the subscript 'calib' represents a data value associated with the backdrop image stored in framestore 80 (the backdrop 'calibration' image), while the subscript 'cust' represents a data value associated with the customer/subject image stored in framestore 82 (the 'customer' image).

Figure 5:
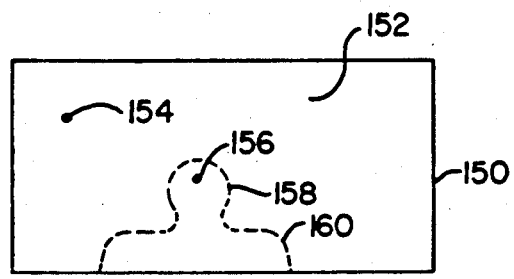
FIG. 5 diagrammatically shows a customer image against a reference colored backdrop.

The ratio obtained in step 201 effectively indicates whether or not the pixel of interest is predominantly backdrop (here, blue). Namely, as diagrammatically shown in FIG. 5, if the pixel of interest falls well within backdrop region 152 of customer image 150, for example, at pixel location 154, so that what the camera pixel array sees at this pixel location is the same for each of the images captured and stored in framestores 80 and 82, then the ratio for each individual pixel of its surrounding block should be approximately equal to one, since there is no non-backdrop (customer) color content at such a pixel location. If, on the other hand, the pixel location falls at a location 156 on a facial portion 158 of a customer region 160, then it can be expected that there will be a contribution other than from the blue backdrop, thereby reducing the denominator and increasing the ratio. Over an accumulation window of nine pixels, the ratio sum will be highest where all nine pixels are well within the customer region, whereas it will be lowest when all nine pixels are only within backdrop. Values in between these maximum and minimum may indicate that the pixel of interest lies in the vicinity of the perimeter of the customer region and the mask value at this location will be tailored to effect a natural blending of the customer and background, as will be described below.

Figure 6:
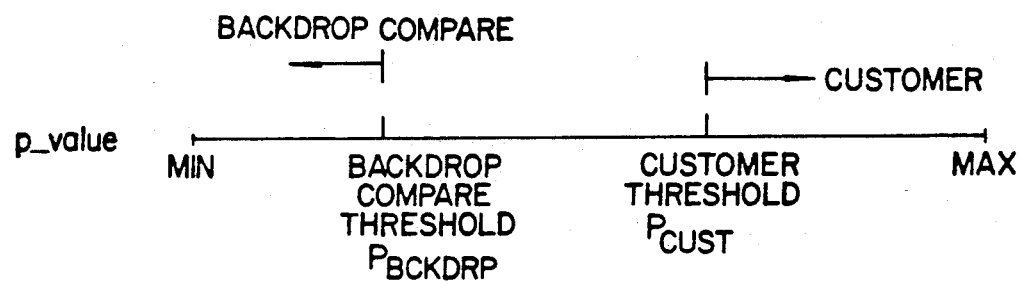
FIG. 6 diagrammatically shows customer and backdrop color thresholds superimposed on a range of $p_-$ value variation.

In step 203, the p_value is compared to an upper, customer threshold $P_{cust}$, diagrammatically shown in FIG. 6 as falling in an upper portion of a range of p_value variation. If the pixel location Pi is within the customer region its p_value should be relatively large, as noted previously. Consequently, if the p_value exceeds this upper (customer) threshold, it is inferred that the pixel Pi falls within the customer image region and, for the foreground (subject) mask, a mask value of MASK_ON is assigned to that pixel location, as denoted in step 205.

For each pixel location in the foreground and background masks, the mask value is calibrated to a prescribed digital resolution, e.g. eight bits. Thus, where the value at pixel location 154 of the foreground mask is MASK_ON, an associated value of 256 would mean that, at this pixel location, the full value of the customer data value will be used in the composite image. Conversely, at the opposite end of the scale, a mask value of MASK_OFF means that the mask value of the foreground mask for that pixel location is equal to zero, so that no customer data would be used in the composite image at this pixel location. Instead only background data would be used. Namely, the foreground and background masks are complementary to one another. The background mask is generated by inverting the foreground mask. Values between MASK_ON and MASK_OFF represent a partial value of the mask, so that a blending of the foreground and background images will occur, as will be described below.

Referring again to FIG. 4, if, in step 203, the p_value is determined not to exceed the upper (customer) threshold (i.e. the answer to step 203 is YES), a further analysis of the imagery data for that pixel location is required in order to determine whether the fact that the customer threshold was not exceeded is due to the possibility that the imagery data has a very little, if any, green content, but may have a significant red content so that it still may fall within a customer region.

Figure 7:
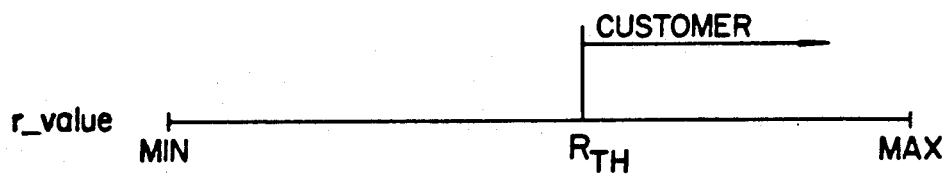
FIG. 7 diagrammatically shows a red value threshold superimposed on a range of $r_-$ value variation.

For this purpose, in step 207, the red components of each of the pixel locations in the associated block are analyzed to derive a red component representative value (r_value) normalized to the size of the block in accordance with difference between the weighted sum of the red component in the customer image ($R_{cust}$) and the weighted sum of the red component in the backdrop image ($R_{calib}$). The weights employed may be derived empirically. It has been found that a weight equal to unity provides a high quality composite image. If the pixel block of interest is located only in the backdrop region of the customer image, then both terms in the difference expression in step 207 should ideally equal zero and the resultant r_value will be also a minimum value of zero. (Electrical noise prevents the difference from actually reaching zero.) If the pixel block falls within a facial portion of the customer region, then it can be expected that there will be a significant red component, thus increasing the r_value. Namely, the larger the r_value, the greater the likelihood that the pixel of interest falls within the customer region. As a result step 207 proceeds to step 209 in which the r_value calculated in step 207 is compared to a customer red component threshold $R_{TH}$, as diagrammatically shown in FIG. 7 as falling at an upper portion of a range of r_value variation. If the r_value exceeds this threshold, it is again inferred that the pixel Pi falls within the customer image region and a foreground mask value of MASK_ON is assigned to that pixel location (step 205).

If, on the other hand, the answer to step 209 is NO, further analysis of the imagery data for that pixel location is required. Specifically, in step 211, the previously calculated p_value is compared to a lower, 'backdrop threshold' $P_{bckdrp}$ shown at a lower portion of the range p_value variation of FIG. 6, in order to determined whether the fact that the customer thresholds in steps 203 and 209 were not exceeded is due to the possibility that the pixel of interest lies in a shadow region or falls in a blue region that may or not be backdrop. If the p_value is less than the backdrop threshold (the answer to question 211 is YES), then it can be inferred that the imagery data is blue and is either true backdrop blue or is a customer blue. In order to determine whether the pixel location is part of the customer or falls in the backdrop, a normalized b_value referenced to the backdrop is calculated in step 213.

Figure 8:
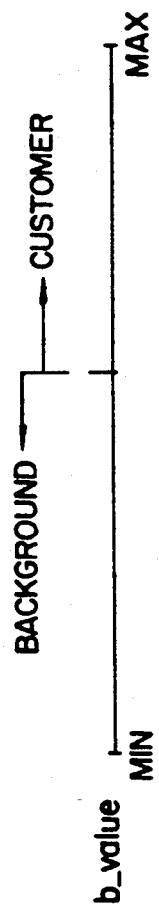
FIG. 8 diagrammatically shows a blue value threshold superimposed on a $b_-$ value variation range.

Specifically, a b_value equal to a normalized sum of the difference between the blue components $B_{calib}$ of the nine pixels in the backdrop block and the blue components $B_{cust}$ of the nine pixels in the customer block is calculated in step 213. In step 215 this b_value is then compared with a blue customer threshold $b_{th}$, diagrammatically shown in the b_value variation range of FIG. 8. As noted earlier, the key and fill lighting of the customer provides a lesser luminance component than the backdrop, so that in the event the customer region contains a color corresponding to that of the backdrop (e.g. blue in the present example), the customer can be distinguished from the backdrop on the basis of the luminance difference. Consequently, the blue customer threshold $b_{th}$ is set at a value based upon this difference in illumination. If the b_value exceeds the threshold (the answer to step 215 is NO), then it is inferred that the pixel of interest lies in the customer region rather than in backdrop and the foreground mask is set at a value of MASK_ON (step 205). On the other hand, if the b_value does not exceed the threshold (the answer to step 215 is YES) then it is inferred that the pixel of interest lies in the lower luminance backdrop and the foreground mask is set at a value of MASK_OFF (step 217).

If the answer in step 211, in which the previously calculated p_value is compared to a lower, 'backdrop threshold', is NO, namely the p_value is greater than the backdrop threshold, then it can be inferred that the imagery data lies either in shadow or lies in the vicinity of the interface between the customer and the backdrop. In the former case, the pixel location actually lies outside the customer region, so that the composite image is to show background at this pixel location. In the latter case, it will be necessary to 'blend' the background with the customer so as to avoid artifacts.

In order to determine whether the pixel location in question lies in true shadow or is located at the perimeter of the customer, a normalized shadow or s_value referenced to the backdrop is calculated in step 221. The shadow calculation involves color parameters other than that of the backdrop (which is blue in the present example). Accordingly, the s_value is set equal to the difference between normalized ratios of the red and green components for the customer image and the backdrop image, respectively. If the pixel location of interest lies in shadow against the blue backdrop then its red and green components will be low and the s_value will be low. On the other hand if the pixel of interest is a border pixel, not in shadow, the numerator of at least one of the red and green ratios will be considerably larger than the denominator and the absolute value of the s_value will be correspondingly larger.

Figure 9:
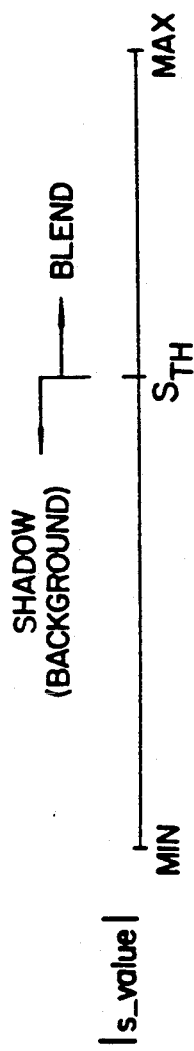
FIG. 9 diagrammatically shows a shadow threshold superimposed on a range of shadow value variation.

The absolute value of the s_value calculated in step 221 is compared in step 223 with a 'shadow' threshold $s_{th}$, diagrammatically shown in the shadow value variation of FIG. 9. If the absolute value of the calculated s_value is relatively low (not greater than the shadow threshold) then it is inferred that the pixel of interest lies in shadow and the foreground mask is set to MASK_OFF in step 225 and only the luminance value of the background is specified at that pixel location. If the absolute value of the calculated s_value is relatively large (greater than the shadow threshold) then it is inferred that the pixel of interest lies along the customer region perimeter, and the foreground and background mask values are set to proportionality values based upon the magnitude of the p_value, so as to effect a blending of the border of the customer region.

In particular, the value of the foreground mask is set equal to the product of the MASK_ON value (255) times customer blend percentage. Conversely, the value of the background mask is set equal to the product of the MASK_ON value (255) times background blend percentage. The customer blend percentage is equal to (p_value − $p_{bckdrp}$)/(p_{cust} − $p_{bckdrp}$). The background blend percentage is equal to ($p_{cust}$ − p_value)/($p_{cust}$ − $p_{bckdrp}$).

As a result of carrying out the process shown in FIG. 4 for each of the pixel locations of the image array, there will be two masks (foreground and background) comprised of respective arrays of coefficients associated with the respective pixel locations of the image array. The respective coefficients of the foreground mask are multiplied, on a pixel by pixel basis, by the data values of the customer image stored in framestore 82, while the respective coefficients of the background mask are multiplied by the data values of the background image stored in framestore 84. The resulting products are then summed to obtain an array of composite image data values which are stored in framestore 86. These data values may then be read out to a downstream I/O unit (color print unit) for supplying the customer with a hard copy of the composite image.

Optionally, the composite image in framestore 86 may be displayed on an attendant color monitor for viewing and acceptance by the customer prior to print out. With a variety of background images stored in a reference library the customer is provided with the ability to see the processed image against a variety of backgrounds before a final print. Since the foreground and background masks have been defined, forming the composite is readily accomplished relative to any chosen background.

As will be appreciated from the foregoing description, the photobooth image processor of the present invention provides an image capture and compositing mechanism capable of controllably merging separate, digitally formatted foreground and background images in a manner which effectively eliminates artifacts and automatically performs a gradual blending of the interface between the foreground image and the background image, so that the foreground image appears to be more naturally part of the background image. Unlike a conventional photobooth, in which the customer's photograph is simply an image of the customer against a solid color backwall, the photoprint produced in accordance with the imagery processing mechanism of the invention places and blends the customer into a separate scenic background image in such a manner that there are no noticeable artifacts between the inserted image and the background image and so that it appears that the subject was actually in the background scene when photographed.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A method of combining an image of a subject with an image of an arbitrary background to thereby form a composite image of said subject and said arbitrary background comprising the steps of:
   (a) generating a first image of a reference backdrop and storing a first plurality of first image data values respectively representative of the contents of said first image at a plurality of locations of an array of image locations within said first image;
   (b) generating a second image of said subject situated in the presence of said reference backdrop and storing a second plurality of second image data values respectively representative of the contents of said second image at said plurality of locations of said array of image locations;
   (c) storing a third plurality of third image data values respectively representative of the contents of a third image containing said arbitrary background at said plurality of locations of said array of image locations;
   (d) for each of plural sets of image locations within said array, processing color contents of the associated data values for each of said first and second images, so as to generate a fourth plurality of first image mask values respectively representative of the contents of a first image mask associated with the image locations of said array containing said subject and a fifth plurality of second image mask values respectively representative of the contents of a second image mask associated with locations of said array other than said subject; and
   (e) combining said fourth and fifth pluralities of respective first and second image mask values with said second plurality of second image data values and said third plurality of third image data values, to thereby obtain a sixth plurality of sixth image data values representative of a composite image of said subject and said arbitrary background.

2. A method according to claim 1, wherein, in step (d), a respective set of plural image locations within said array of image locations comprises a two-dimensional sub-array of image locations the color contents of which are processed to obtain a respective first image mask value and a respective second image mask value for one of the image locations of said array of image locations.

3. A method according to claim 2, wherein said one of the image locations of said sub-array is surrounded by other image locations of said sub-array.

4. A method according to claim 1, wherein said reference backdrop is that of a prescribed color backdrop and step (d) includes analyzing the color contents of the associated data values for each of said first and second images in accordance with a prescribed color attribute of said prescribed color backdrop.

5. A method according to claim 1, wherein said reference backdrop is that of a prescribed color backdrop and step (d) includes analyzing the color contents of the associated data values for each of said first and second images in accordance with a color other than the predominant color in said prescribed color backdrop.

6. A method according to claim 1, wherein said reference backdrop is that of a prescribed color backdrop and step (d) includes analyzing the color contents of the associated data values for each of said first and second images in accordance with the degree of predominance of said prescribed color therein.

7. A method according to claim 1, wherein said reference backdrop is that of a prescribed color backdrop and step (d) includes analyzing the color contents of the associated data values for each of said first and second images in accordance with the degree of presence of colors other than said prescribed color therein.

8. A method according to claim 1, wherein said reference backdrop is that of a prescribed color backdrop and step (d) includes generating said second image mask values respectively representative of the contents of said second image mask in dependence upon the degree of predominance of said prescribed color in said first and second images and generating said first image mask values respectively representative of the contents of said first image mask in dependence upon the degree of presence of colors other than said prescribed color in said first and second images.

9. A method according to claim 1, wherein said reference backdrop is that of a prescribed color backdrop and step (d) includes generating said first image mask values respectively representative of the contents of said first mask image in dependence upon a first degree of presence of colors other than said prescribed color in said first and second images and said second image mask values respectively representative of the contents of said second mask image in dependence upon a second degree of presence of colors other than said prescribed color in said first and second images.

10. A method of forming a composite image of a subject and an image of an arbitrary background comprising the steps of:
   (a) illuminating a prescribed color backdrop in front of which said subject is to be situated and generating a first image of said prescribed color backdrop;
   (b) storing a first plurality of first image data values respectively representative of the contents of said first image at a plurality of locations of an array of image locations within said first image;

(c) illuminating said backdrop and a subject situated in front of said prescribed color backdrop and generating a second image of said subject and said illuminated backdrop;

(d) storing a second plurality of second image data values respectively representative of the contents of said second image at said plurality of locations of said array of image locations;

(e) storing a third plurality of third image data values respectively representative of the contents of a third image containing said arbitrary background at said plurality of locations of said array of image locations;

(f) for each of plural sets of image locations within said array, processing color contents of the associated data values for each of said first and second images, so as to generate a fourth plurality of first image mask values respectively representative of the contents of a first image mask associated with the image locations of said array containing said subject and a fifth plurality of second image mask values respectively representative of the contents of a second image mask associated with locations of said array other than said subject; and (g) combining said fourth and fifth pluralities of respective first and second image mask values with said second plurality of second image data values and said third plurality of third image data values to thereby obtain a sixth plurality of sixth image data values representative of a composite image of said subject and said arbitrary background.

11. A method according to claim 10, wherein step (f) comprises analyzing the color contents of the associated data values for each of said first and second images in accordance a prescribed color attribute of said backdrop.

12. A method according to claim 10, wherein step (f) comprises analyzing the color contents of the associated data values for each of said first and second images in accordance with a color other than the predominant color in said prescribed color backdrop.

13. A method according to claim 10, wherein step (f) includes generating said second mask image values respectively representative of the contents of said second image mask in dependence upon the degree of predominance of said prescribed color in said first and second images and generating said first image mask values respectively representative of the contents of said first mask image in dependence upon the degree of presence of colors other than said prescribed color in said first and second images.

14. A method according to claim 10, wherein step (f) includes generating said first image mask values respectively representative of the contents of said first image mask in dependence upon a first degree of presence of colors other than said prescribed color in said first and second images and said second image mask values respectively representative of the contents of said second image mask in dependence upon a second degree of presence of colors other than said prescribed color in said first and second images.

15. A method according to claim 10, wherein step (c) comprises illuminating said subject from a plurality of different illumination directions.

16. A method according to claim 15, wherein step (c) comprises illuminating said subject from lighting locations above, to the rear and in front of said subject.

17. A method according to claim 10, wherein step (f) comprises processing color contents of the associated data values for each of said first and second images with reference to said prescribed color in said first and second images to identify which of the image locations within said array of image locations contain an image of said subject.

18. A method according to claim 10, wherein step (f) comprises processing color contents of the associated data values for each of said first and second images in dependence upon the presence of one or more colors other than said prescribed color in said first and second images to identify which of the image locations within said array of image locations contain an image of said subject.

19. A method according to claim 18, wherein step (f) comprises processing color contents of the associated data values for each of said first and second images in accordance with predetermined relationships between color contents of said first and second images.

20. A method according to claim 17, wherein step (f) comprises processing color contents of the associated data values for each of said first and second images in dependence upon the presence of one or more colors other than said prescribed color in said first and second images to identify at which of the image locations containing said subject, associated first and second image mask values are to be controllably weighted in the course of being combined with said third image data values and said second image data values to obtain said sixth plurality of sixth image data values representative of a composite image of said subject and said arbitrary background.

21. A method of forming a composite image of a subject and an image of an arbitrary background comprising the steps of:

(a) illuminating a prescribed color backdrop in front of which said subject is to be situated and generating a first image of said prescribed color backdrop;

(b) storing, in a backdrop imagery database, a first plurality of first image data values respectively representative of the contents of said first image at a plurality of locations of an array of image locations within said first image;

(c) illuminating said backdrop and a subject situated in front of said prescribed color backdrop and generating a second image of said subject and said illuminated backdrop;

(d) storing, in a subject imagery database, a second plurality of second image data values respectively representative of the contents of said second image at said plurality of locations of said array of image locations;

(e) storing, in a background imagery database, a third plurality of third image data values respectively representative of the contents of a third image containing said arbitrary background at said plurality of locations of said array of image locations;

(f) for each respective pixel location within said array, processing color contents of associated data values for a plurality of pixel locations, including said each respective pixel location, of said first and second images contained in said backdrop and subject databases, so as to generate a fourth plurality of first image mask values respectively representative of the contents of a first image mask associated with the image locations of said array containing said subject and a fifth plurality of second image mask values respectively representative of the contents of a second image mask associated with locations of said array other than said subject; and (g) combining said fourth and fifth pluralities of respective first and second image mask values with said third plurality of third image data values in said background database, and said second plurality of second image data values, to thereby obtain a sixth plurality of sixth image data values representative of a composite image of said subject and said arbitrary background.

22. A method according to claim 21, wherein step (f) comprises the steps of:

(f1) generating a first value representative of the likelihood of the presence of a color other than said backdrop color for said plurality of pixel locations; and (f2) in response to said first value exceeding a prescribed subject threshold associated with the presence of a subject region in said second image, setting a first code value of said first image mask for said respective pixel location at a first mask value representative that the imagery data value of said second image is to be selected for said respective pixel location and setting a second code value of said second image mask for said respective pixel location at a second mask value representative that the data value of said first image is to be deselected for said respective pixel location.

23. A method according to claim 22, wherein step (f) further comprises the steps of:

(f3) in response to said first value not exceeding said prescribed subject threshold, generating a second value representative of the degree of presence of a selected color other than the color of said backdrop for said plurality of pixel locations; and (f4) in response to said second value exceeding a predetermined selected color threshold associated with the presence of a subject region in said second image. setting said first code value of said first image mask for said respective pixel location at said first mask value representative that the imagery data value of said second image is to be selected for said respective pixel location and setting said second code value of said second image mask for said respective pixel location at said second mask value representative that the data value of said first image is to be deselected for said respective pixel location.

24. A method according to claim 23, wherein step (f) further includes the steps of:

(f5) in response to said second value not exceeding said predetermined selected color threshold, comparing said first value to a backdrop threshold associated with the presence of a backdrop region in said second image;

(f6) in response to said first value not exceeding said backdrop threshold, generating a third value representative of the degree of presence of said backdrop color for said plurality of pixel locations; and (f7) in response to said third value exceeding a predetermined backdrop color threshold, setting said first code value of said first image mask for said respective pixel location at said first mask value representative that the imagery data value of said second image is to be selected for said respective pixel location and setting said second code value of said second image mask for said respective pixel location at said second mask value representative that the data value of said first image is to be deselected for said respective pixel location, but otherwise setting said first code value of said first image mask for said respective pixel location at said second mask value representative that the imagery data value of said second image is to be deselected for said respective pixel location and setting said second code value of said second image mask for said respective pixel location at said first mask value representative that the data value of said first image is to be selected for said respective pixel location.

25. A method according to claim 24, wherein step (f) further includes the steps of:

(f8) in response to said first value exceeding said backdrop threshold, generating a fourth value representative of the likelihood that said respective pixel location lies in a shadow region of said second image;

(f9) comparing said fourth value to a shadow threshold associated with the presence of said shadow region; and (f10) in response to said fourth value not exceeding said shadow threshold, setting said first code value of said first image mask for said respective pixel location at said second mask value representative that the imagery data value of said second image is to be deselected for said respective pixel location and setting said second code value of said second image mask for said respective pixel location at said first mask value representative that the data value of said first image is to be selected for said respective pixel location, but otherwise setting said first code value of said first image mask for said respective pixel location at a third mask value representative of a first fractional selection of the imagery data value of said second image for said respective pixel location and setting said second code value of said second image mask for said respective pixel location at a fourth mask value representative of a second fractional selection of the imagery data value of said first image for said respective pixel location.

26. A photobooth image processing apparatus for generating a composite image of a subject and an arbitrary background, said photobooth having a reference colored backdrop situated behind a location whereat a subject is to be situated comprising, in combination:

an imaging camera arranged to view said backdrop, and said subject, when present in the photobooth, against said backdrop;

a backdrop imaging arrangement which illuminates said backdrop in front of which said subject is to be situated and causes said imaging camera to generate an image of said backdrop and produce a first plurality of backdrop image data values respectively representative of the contents of said backdrop image at a plurality of locations of an array of image locations within backdrop first image;

a backdrop image database which stores said first plurality of backdrop image data values;

a subject imaging arrangement which illuminates said backdrop and said subject against said backdrop and causes said imaging camera to generate a subject image of said subject against said backdrop and to produce a second plurality of subject image data values respectively representative of the contents of said subject image at said plurality of locations of said array of image locations;

a subject image database which stores said second plurality of subject image data values respectively representative of the contents of said subject image at said plurality of locations of said array;

a background image database which stores a third plurality of background image data values respectively representative of the contents of a background image containing said arbitrary background at said plurality of locations of said array; and an imagery data processor which, for each of plural sets of image locations within said array, processes color contents of the associated data values for each of said backdrop and subject images, so as to generate a fourth plurality of first image mask values respectively representative of the contents of a first image mask associated with the image locations of said array containing said subject and a fifth plurality of second image mask values respectively representative of the contents of a second image mask associated with locations of said array other than said subject, said imagery data processor combining said fourth and fifth pluralities of respective first and second image mask values with said second plurality of subject image data values and said third plurality of background image data values to thereby obtain a sixth plurality of sixth image data values representative of a composite image of said subject and said arbitrary background.

27. An apparatus according to claim 26, wherein said processor is programmed to analyze the color contents of the associated data values for each of said backdrop and subject images in accordance with a prescribed color attribute of said backdrop.

28. An apparatus according to claim 26, wherein said processor is programmed to analyze the color contents of the associated data values for each of said backdrop and subject images in accordance with a color other than the predominant color in said backdrop.

29. An apparatus according to claim 26, wherein said processor generates said second mask image values respectively representative of the contents of said second image mask in dependence upon the degree of predominance of said reference color in said backdrop and subject images and generates said first image mask values respectively representative of the contents of said first mask image in dependence upon the degree of presence of colors other than said reference color in said backdrop and subject images.

30. An apparatus according to claim 26, wherein said processor generates said first image mask values respectively representative of the contents of said first image mask in dependence upon a first degree of presence of colors other than said reference color in said backdrop and subject images and said second image mask values respectively representative of the contents of said second image mask in dependence upon a second degree of presence of colors other than said reference color in said backdrop and subject images.

31. An apparatus according to claim 26, wherein said subject imaging arrangement includes a lighting configuration which illuminates said subject from a plurality of different illumination directions.

32. An apparatus according to claim 31, wherein said subject imaging arrangement includes a lighting configuration which illuminates said subject from lighting locations above, to the rear and in front of said subject.

33. An apparatus according to claim 26, wherein said processor is programmed to process color contents of the associated data values for each of said backdrop and subject images in accordance with the presence of said reference color in said backdrop and subject images, so to identify which of the image locations within said array of image locations contain an image of said subject.

34. An apparatus according to claim 33, wherein said processor is programmed to process color contents of the associated data values for each of said backdrop and subject images in dependence upon the presence of one or more colors other than said reference color in said backdrop and subject images to identify which of the image locations within said array of image locations contain an image of said subject.

35. An apparatus according to claim 26, wherein said processor is programmed to process color contents of the associated data values for each of said backdrop and subject images in accordance with predetermined relationships between color contents of said backdrop and reference images.

36. An apparatus according to claim 33, wherein said processor is programmed to process color contents of the associated data values for each of said backdrop and subject in dependence upon the presence of one or more colors other than said reference color in said backdrop and subject images to identify at which of the image locations containing said subject, associated first and second image mask values are to be controllably weighted in the course of being combined with said background image data values and said subject image data values to obtain said sixth plurality of sixth image data values representative of a composite image of said subject and said arbitrary background.

37. A photobooth image processing apparatus for generating a composite image of a subject and an arbitrary background, said photobooth having a prescribed color backdrop situated behind a location whereat a subject is to be situated when imaged comprising, in combination:

an imaging camera arranged to view said backdrop, and said subject, when present in the photobooth, against said backdrop;

a backdrop imaging arrangement which illuminates said backdrop in front of which said subject is to be situated and causes said imaging camera to generate an image of said backdrop and produce a first plurality of backdrop image data values respectively representative of the contents of said backdrop image at a plurality of locations of an array of image locations within backdrop first image;

a backdrop image database which stores said first plurality of backdrop image data values;

a subject imaging arrangement which illuminates said backdrop and said subject against said backdrop and causes said imaging camera to generate a subject image of said subject against said backdrop and to produce a second plurality of subject image data values respectively representative of the contents of said subject image at said plurality of locations of said array of image locations;

a subject image database which stores said second plurality of subject image data values respectively representative of the contents of said subject image at said plurality of locations of said array;

a background image database which stores a third plurality of background image data values respectively representative of the contents of a background image containing said arbitrary background at said plurality of locations of said array;

an imagery data processor which, for each respective pixel location within said array, processes color contents of associated data values for a plurality of pixel locations, including said each respective pixel location, of said backdrop and subject images data values for which are respectively stored in said backdrop and subject databases, so as to generate a fourth plurality of first image mask values respectively representative of the contents of a first image mask associated with the image locations of said array containing said subject and a fifth plurality of second image mask values respectively representative of the contents of a second image mask associated with locations of said array other than said subject; and combining said fourth and fifth pluralities of respective first and second image mask values with said second plurality of subject image data values and said third plurality of background image data values stored in said background database, to thereby obtain a sixth plurality of sixth image data values representative of a composite image of said subject and said arbitrary background.

38. An apparatus according to claim 37, wherein said processor is programmed to execute a prescribed image processing program comprising the steps of:

(a) generating a first value representative of the likelihood of the presence of a color other than said backdrop color for said plurality of pixel locations; and (b) in response to said first value exceeding a prescribed subject threshold associated with the presence of a subject region in said second image, setting a first code value of said first image mask for said respective pixel location at a first mask value representative that the imagery data value of said second image is to be selected for said respective pixel location and setting a second code value of said second image mask for said respective pixel location at a second mask value representative that the data value of said first image is to be deselected for said respective pixel location.

39. An apparatus according to claim 38, wherein said a prescribed image processing program further comprises the steps of:

(c) in response to said first value not exceeding said prescribed subject threshold, generating a second value representative of the degree of presence of a selected color other than the color of said backdrop for said plurality of pixel locations; and (d) in response to said second value exceeding a predetermined selected color threshold associated with the presence of a subject region in said second image, setting said first code value of said first image mask for said respective pixel location at said first mask value representative that the imagery data value of said second image is to be selected for said respective pixel location and setting said second code value of said second image mask for said respective pixel location at said second mask value representative that the data value of said first image is to be deselected for said respective pixel location.

40. An apparatus according to claim 39, wherein said a prescribed image processing program further comprises the steps of:

(e) in response to said second value not exceeding said predetermined selected color threshold, comparing said first value to a backdrop threshold associated with the presence of a backdrop region in said second image;

(f) in response to said first value not exceeding said backdrop threshold, generating a third value representative of the degree of presence of said backdrop color for said plurality of pixel locations; and (g) in response to said third value exceeding a predetermined backdrop color threshold, setting said first code value of said first image mask for said respective pixel location at said first mask value representative that the imagery data value of said second image is to be selected for said respective pixel location and setting said second code value of said second image mask for said respective pixel location at said second mask value representative that the data value of said first image is to be deselected for said respective pixel location, but otherwise setting said first code value of said first image mask for said respective pixel location at said second mask value representative that the imagery data value of said second image is to be deselected for said respective pixel location and setting said second code value of said second image mask for said respective pixel location at said first mask value representative that the data value of said first image is to be selected for said respective pixel location.

41. An apparatus according to claim 40, wherein said a prescribed image processing program further comprises the steps of:

(h) in response to said first value exceeding said backdrop threshold, generating a fourth value representative of the likelihood that said respective pixel location lies in a shadow region of said second image;

(i) comparing said fourth value to a shadow threshold associated with the presence of said shadow region; and (j) in response to said fourth value not exceeding said shadow threshold, setting said first code value of said first image mask for said respective pixel location at said second mask value representative that the imagery data value of said second image is to be deselected for said respective pixel location and setting said second code value of said second image mask for said respective pixel location at said first mask value representative that the data value of said first image is to be selected for said respective pixel location, but otherwise setting said first code value of said first image mask for said respective pixel location at a third mask value representative of a first fractional selection of the imagery data value of said second image for said respective pixel location and setting said second code value of said second image mask for said respective pixel location at a fourth mask value representative of a second fractional selection of the imagery data value of said first image for said respective pixel location.

42. An apparatus according to claim 37, wherein said subject imaging arrangement includes a lighting configuration which illuminates said subject from a plurality of different illumination directions.

43. An apparatus according to claim 42, wherein said subject imaging arrangement includes a lighting configuration which illuminates said subject from lighting locations above, to the rear and in front of said subject.

44. An apparatus according to claim 37, wherein said subject imaging arrangement includes a backlighting configuration which illuminates said subject so that the luminance component of the backlighting illumination is the same as the luminance component of backdrop lighting that has been reflected off said backdrop and is incident upon said subject.

45. An apparatus according to claim 37, wherein said subject imaging arrangement includes a backlighting configuration which illuminates said subject so that the chrominance component of the backlighting illumination is the complement of the chrominance component of the backdrop lighting that has been reflected off said backdrop and incident upon said subject.

46. An apparatus according to claim 37, wherein said subject imaging arrangement includes a subject lighting configuration which illuminates said subject so that the luminance component of the subject illumination is different from the luminance component of the backdrop lighting that has been reflected off said backdrop as imaged on said video camera.

* * * * *